Patented May 27, 1947

2,421,302

UNITED STATES PATENT OFFICE 2,421,302

PROCESS FOR IMPROVING THE EXTENSIBILITY AND STRENGTH OF HARDENED ARTIFICIAL FILAMENTS, FILMS, AND LIKE THIN MATERIALS HAVING A PROTEIN BASIS

Robin Hamilton Kendall Thomson, Kilwinning, Scotland, assignor to Imperial Chemical Industries Limited, a corporation of Great Britain No Drawing. Application August 24, 1942, Serial No. 455,942. In Great Britain September 12, 1941

5 Claims. (Cl. 34—23)

This invention relates to the manufacture of hardened artificial filaments, fibres, threads, bristles, films and the like thin material made by coagulating protein solutions more especially those derived from casein and vegetable globulins.

In the manufacture of artificial filaments from proteins, the protein is dissolved in a suitable medium and extruded through a spinnerette into a suitable coagulating bath, the resulting coagulated filaments being subjected to a hardening treatment with formaldehyde or the like and advantageously also with materials adapted further to increase their resistance to wet processing such as dyeing in acid dye baths. The filaments are then dried. As overdrying produces a filament which is hard and brittle it has been customary to dry the filaments in air at a temperature only slightly above atmospheric. This results in a filament having a moisture content in the neighbourhood of 9 to 12 per cent, and if the filament is dried to a lower moisture content it will, on exposure to an atmosphere of ordinary humidity take up moisture until the moisture content is again in this neighbourhood. A considerable variation is to be found in the properties of thin hardened coagulated protein material made in this and similar manners. For instance, they vary considerably in the elongation to which they can be subjected before breaking.

Thus, in the case of filaments, some may show an elongation at break of about 50 to 100 per cent. or even more, while others break at an elongation of about 10 to 30 per cent. Furthermore those which show a good extensibility when freshly made may deteriorate in respect of this quality on storage, more particularly if conditions are such that their moisture content diminishes, but such deterioration may also take place without alteration of the moisture content of the batch of material. Moreover, although it is to be expected that the extensibility of the filaments should diminish as their moisture content is reduced, it sometimes happens that when the storage conditions result in a diminution of the moisture content the filaments will show a slight increase in their extensibility when they are tested in an atmosphere of ordinary humidity.

These variations in extensibility may occur not only between batch and batch but also between individual filaments in each batch. They are especially marked when the moisture content lies between approximately 9½ per cent. and 13½ per cent., when filaments of high and of low extensibility are specially liable to be encountered together, whereas filaments containing more than 13½ per cent. tend always to show a high extensibility and those containing less than 9½ per cent. moisture always a low extensibility. It will be appreciated that this range of moisture content at which the elongation at break of the individual filaments tends to be widely dissimilar is substantially the same as the range of moisture content that the filaments assume in ordinary atmospheres after they have been dried in known manner.

The present invention provides a process whereby hardened artificial filaments, films and the like thin materials having a protein basis obtained by coagulation of extruded protein solution, subjection of the material to a hardening treatment involving the use of formaldehyde and adapted to render them capable of being dyed in acid dye-baths, and washing, are improved in their physical properties, in that their average strength and also their elongation in the air dry condition if it is low, are increased. Elongation at break of air dry material obtained according to the present invention and having a moisture content not below 9½% is usually similar to that possessed by the individual elements of filamentary material of good elongation which are found in the air dry material obtained by the aforementioned known process. The material obtained according to the present invention thus shows an elongation at break similar to that of the material obtained by the aforementioned known process having a moisture content higher than that ordinarily assumed when the material is exposed to the atmosphere.

According to the present invention, the aforesaid coagulated and hardened thin materials having a protein basis are desiccated and are then heat treated at a temperature between about 85° C. and about 120° C. for a period of time insufficient to injure them and are then rehumidified.

In order to desiccate the material it is necessary to heat it to a high temperature, since the protein material has a strong affinity for water, and it is usually convenient to carry out the desiccation and the subsequent heat treatment of the material in a single operation without attempting to determine or observe the exact point at which the material becomes desiccated. For this reason it is seldom necessary to know the exact time for which heat treatment of the desiccated material should be carried on, especially since it is not at all easy to tell when the material first becomes dry except by observation of its weight loss rate. But the time required for the heat treatment of the desiccated material is the shorter the higher the temperature, and may amount to a period of some hours at 100° C. The treatment should be discontinued before the tensile strength of the rehumidified material commences to fall after having attained its maximum.

The desiccation and subsequent heat treatment may advantageously be carried out by exposing the material in a hot chamber to a current of hot air preheated to the desired final temperature. Owing to the latent heat of the water, the material in the hot chamber will not attain its maximum temperature until it is dry, and the time required for the desiccation will depend on the original moisture content of the material, the humidity of the air, the rate of passage of the air through the material and the temperature conditions. When the other conditions are comparable, the temperature at which it is desired to carry out the heat treatment of the desiccated material will thus greatly influence the time required to carry out the process as a whole.

The process is applicable both to material that has already been air dried at temperatures not substantially in excess of atmospheric temperatures in known manner and to material that has not been subjected to a drying operation and thus contains all the water that cannot conveniently be squeezed out of it. When dried off in a current of hot air under conditions adapted to bring the desiccated material to a temperature of about 85° C. to about 120° C., the occurrence of opaque individual elements of filamentary material in the dried water wet material is prevented.

Even when air dry material is used the time required for the desiccation and subsequent heat treatment will vary according to the rate of air passage as well as the final temperature required, but this dependence of the time on the circulation will be the less the higher the temperature used. As a rule it is necessary to heat for a long time to obtain the beneficial effects on the elongation at break and the tensile strength when the final temperature is 85° C., but useful results are likely to be obtained in 4 to 8 hours when the temperature is 100° C. and in 3 to 4 hours at 120° C. At temperatures above about 120° C. the material is apt to char.

After exposure to the temperature used the desiccated fibre is hard and brittle, and must be rehumidified before it is used. This can easily be done by exposing the material to a humid atmosphere, preferably at ordinary temperature.

The invention is further illustrated by the following examples.

Example 1

A sample of peanut protein fibre manufactured by extruding a solution of peanut protein in dilute caustic soda into an acid coagulating bath, and subsequently treating the fibre so formed with a saturated solution of common salt while the fibre was held from shrinkage, followed by a hardening process in a bath containing sodium chloride, sulphuric acid and formaldehyde, was washed and then dried in a normal atmosphere at about 30° C. The fibre was found to have the following characteristics.

Strength at break_____ kg. per sq. mm__ 9.2
Elongation at break_____ per cent__ 68

The fibre was then exposed for 4 hours to a temperature of 100° C. At the end of this time the fibre was hard and brittle and had lost the moisture which it originally contained. It was then exposed to an atmosphere having a 50 per cent. humidity at room temperature for 16 hours until it had again taken up about 10 to 12 per cent. moisture and was supple and soft.

It was then found to have the following characteristics.

Strength at break_____kg. per sq. mm__ 11.9
Elongation at break_____ per cent__ 80

Example 2

Another sample prepared as in Example 1 was found on drying in a normal atmosphere at about 30° C. to have the following characteristics.

Strength at break_____ kg. per sq. mm__ 8.5
Elongation at break_____ per cent__ 14.5

After treatment for four hours at 100° C. the fibre was brittle and dry, but regained its suppleness after exposure to an atmosphere having a 50 per cent. humidity at room temperature for 16 hours. It then had the following characteristics.

Strength at break_____ kg. per sq. mm__ 10.4
Elongation at break_____per cent__ 50

Example 3

A sample of peanut protein fibre manufactured in the same manner as that in Example 1 was found on drying in a normal atmosphere at about 30° C. to have a strength at break of 6.02 kg. per sq. mm. and an elongation at break of 12.2 per cent. After heating for four hours at 100° C. and then being exposed to an atmosphere having a 50 per cent. humidity for 16 hours the strength at break was 15.5 kg. per sq. mm. and the elongation at break was found to be 73 per cent. The sample was then stored for five weeks and again tested for elongation which was found to be 72 per cent.

Example 4

A sample of peanut protein fibre manufactured in the same manner as that in Example 1 was found on drying at about 30° C. in a normal atmosphere to have an elongation at break of 54 per cent. and a strength of 9.8 kg. per sq. mm. After treatment for 8 hours at 100° C. followed by exposure to an atmosphere having a humidity of 50 per cent. for 16 hours, the strength was found to be 11.8 kg. per sq. mm. and the elongation at break 63 per cent.

Example 5

A sample of casein fibre was found to have a strength of 6.9 kg. per sq. mm. and an elongation at break of 38 per cent. After being treated for four hours at 100° C. and then exposed to an atmosphere with a 50 per cent humidity for 16 hours the strength had increased to 8.2 kg. per sq. mm. and the elongation at break to 55 per cent.

Example 6

A sample of peanut protein fibre manufactured in the same manner as that in Example 1 was found to have a strength of 8.9 kg. per sq. mm. and an elongation at break of 24 per cent. After treating for three and a half hours at 120° C. and re-humidifying it had a strength of 12.3 kg. per sq. mm. and an elongation at break of 63 per cent.

Example 7

A sample of peanut protein bristles was made in a similar manner to the fibres in Example 1 except that it was extruded through an orifice of such size that bristles with an average diameter of 0.35 mm. were obtained. These had a strength of 12 kg. per sq. mm. and elongation at break of 60 per cent. After treatment for four hours at 100° C. and rehumidification these had a strength of 14.6 kg. per sq. mm. and an elongation at break of 104 per cent.

Filaments having a tensile strength of 11½ to 15½ kilograms per square millimetre and elongation at break of 70 to 105 per cent at a moisture content of 9 to 12 per cent are easily obtained according to the process of the invention, when the filamentous material subjected to the treatment is a vegetable globulin derived material prepared according to British specifications 513,910 and 543,586. These figures are obtained on test in a Cliff Autographic Recorder, which is described in Shirley Institute Memoirs 12, 93.

I claim:

1. A process for the treatment of washed formaldehyde hardened artificial filamentous coagulated protein material containing associated water which consists in substantially completely removing the moisture from said material, thereafter heating the moisture-free material to a temperature between 85° C. and 120° C. by subjecting the material to a current of heated air having a temperature between about 100° C. and 120° C. for between three to eight hours, the period of time of the heat treatment being longer the lower the temperature, and then rehumidifying the material to a moisture content between about 9.5% and 13%.

2. A process for the treatment of washed formaldehyde hardened artificial filamentous coagulated protein material moistened by water that cannot conveniently be squeezed from the material, which comprises heating the material to a temperature between 85° C. and 120° C. by subjecting the material to a current of air preheated to a temperature between 100° C. and 120° C. for between three to eight hours, the period of time of heat treatment being longer the lower the temperature of treatment, and thereafter rehumidifying the heat-treated material to a moisture content between about 9.5% and 13%.

3. A process according to claim 1 wherein the moisture removal step and the heat treatment step are conducted in an uninterrupted operation.

4. A process for the treatment of washed formaldehyde hardened artificial filamentous coagulated protein material containing associated water which consists in substantially completely removing the moisture of said material, thereafter heat treating the moisture-free material at a temperature between about 100° C. and 120° C. for between three to eight hours, the period of time of heat treatment being longer the lower the temperature, and thereafter rehumidifying the material to a moisture content between about 9.5% and 13%.

5. A process for the treatment of washed formaldehyde hardened artificial filamentous coagulated protein material containing associated water which consists in substantially completely removing the moisture from said material, heat treating the moisture-free material by heating the material to a temperature between 85° C. and 120° C., the time of heat treatment being greater than about three hours but less than the period of time beyond which the tensile strength of the rehumidified material commences to fall after having attained its maximum, said time being longer the lower the temperature, and, thereafter, rehumidifying the material.

ROBIN H. K. THOMSON.

REFERENCES CITED

The following references are of record in the file of this patent:

UNITED STATES PATENTS

| Number | Name | Date |
|---|---|---|
| 1,867,297 | Zart | July 12, 1932 |
| 2,170,439 | Wiezevich | Aug. 22, 1939 |
| 1,581,803 | Hulbert | Apr. 20, 1926 |
| 2,119,261 | Andrews | May 31, 1938 |
| 1,955,323 | Carter | Apr. 17, 1934 |
| 2,090,352 | Herrmann | Aug. 17, 1937 |
| 2,002,996 | Hoefinghoff et al. | May 28, 1935 |
| 1,975,708 | Bleibler | Oct. 2, 1934 |